(12) United States Patent
Gail et al.

(10) Patent No.: US 8,235,392 B2
(45) Date of Patent: Aug. 7, 2012

(54) SEAL ARRANGEMENT

(75) Inventors: Alfons Gail, Friedberg (DE); Wilhelm Gräbeldinger, Munich (DE); Alexander Rauschmeier, Siferling (DE)

(73) Assignee: MTU Aero Engines GmbH, Munich (DE)

( * ) Notice: Subject to any disclaimer, the term of this patent is extended or adjusted under 35 U.S.C. 154(b) by 500 days.

(21) Appl. No.: 12/446,421

(22) PCT Filed: Oct. 11, 2007

(86) PCT No.: PCT/DE2007/001808
§ 371 (c)(1),
(2), (4) Date: Jun. 5, 2009

(87) PCT Pub. No.: WO2008/046390
PCT Pub. Date: Apr. 24, 2008

(65) Prior Publication Data
US 2010/0320696 A1    Dec. 23, 2010

(30) Foreign Application Priority Data
Oct. 20, 2006 (DE) .......................... 10 2006 049 634

(51) Int. Cl.
*F16J 15/44* (2006.01)
(52) U.S. Cl. ...................................................... 277/355
(58) Field of Classification Search .................... 277/355
See application file for complete search history.

(56) References Cited

U.S. PATENT DOCUMENTS

| | | | | | |
|---|---|---|---|---|---|
| 4,209,268 | A | * | 6/1980 | Fujiwara et al. | 405/147 |
| 5,099,886 | A | * | 3/1992 | Squirrell | 137/856 |
| 6,059,526 | A | * | 5/2000 | Mayr | 415/231 |
| 6,352,263 | B1 | * | 3/2002 | Gail et al. | 277/355 |
| 6,695,314 | B1 | * | 2/2004 | Gail et al. | 277/355 |
| 6,742,782 | B2 | * | 6/2004 | Beichl | 277/409 |

(Continued)

FOREIGN PATENT DOCUMENTS

DE    196 18 475 A1    11/1997

(Continued)

OTHER PUBLICATIONS

PCT/DE2007/001808, International Search Report with Written Opinion, Jan. 17, 2008.

*Primary Examiner* — Alison Pickard
(74) *Attorney, Agent, or Firm* — Howison & Arnott, L.L.P.

(57) ABSTRACT

The invention relates to a sealing arrangement for a non-hermetic seal of a gap (11) between a stator and a rotor with a brush seal (13), wherein the brush seal (13) has a bristle package (14) with several bristles (15), the bristles are wound about a core element (16) and fixed to the core element (16), wherein the brush seal (13) is disposed at least sectionally in an accommodating space, which is bounded by a supporting element (18) and a covering element (19), and wherein the bristles (15) have sealing bristle sections (21), which are at an angle to the bristle shafts (20) and the ends of which run against a sealing surface (22) of the rotor (12). According to the invention, the covering element (19) has a support surface (23) at an end adjacent to the sealing bristle sections (21), wherein the supporting surface (23) contacts the bristle shafts (20) in a defined, locally limited region, so that the radial mobility of the sealing bristle sections (21) is limited in the direction of the rotor (12).

17 Claims, 1 Drawing Sheet

U.S. PATENT DOCUMENTS

| | | | |
|---|---|---|---|
| 6,808,180 B2 * | 10/2004 | Shore | 277/355 |
| 7,290,769 B2 * | 11/2007 | Plona et al. | 277/355 |
| 7,578,509 B2 * | 8/2009 | Grondahl | 277/355 |
| 2004/0150165 A1 * | 8/2004 | Grondahl | 277/355 |
| 2005/0151324 A1 * | 7/2005 | Plona et al. | 277/355 |
| 2006/0055118 A1 * | 3/2006 | Beichl | 277/346 |

FOREIGN PATENT DOCUMENTS

| | | |
|---|---|---|
| DE | 603 05 357 T2 | 9/2006 |
| EP | 1 006 301 A | 6/2000 |

* cited by examiner

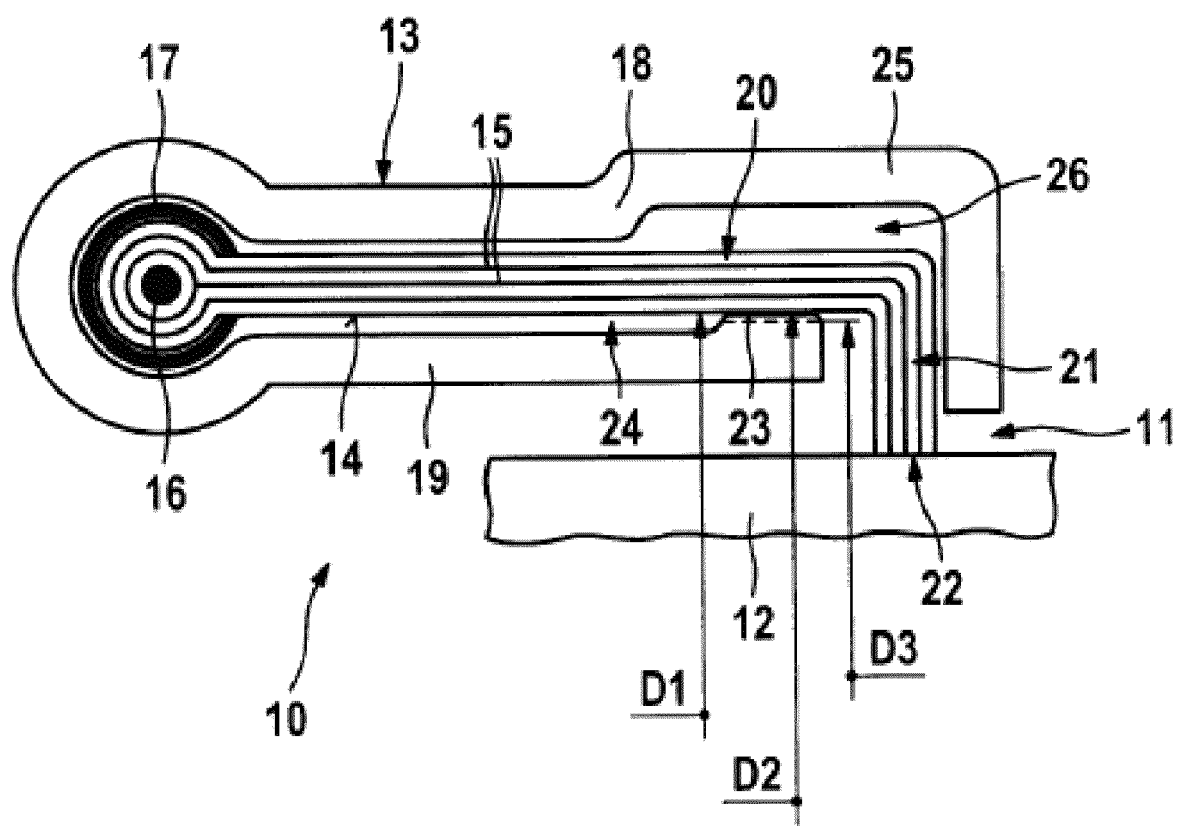

SEAL ARRANGEMENT

CROSS-REFERENCE TO RELATED APPLICATIONS

This application is a U.S. National Phase application submitted under 35 U.S.C. §371 of Patent Cooperation Treaty application serial no. PCT/DE2007/001808, filed Oct. 11, 2007, and entitled SEAL ARRANGEMENT, which application claims priority to German patent application serial no. DE 10 2006 049 634.5, filed Oct. 20, 2006, and entitled DICHTUNGSANORDNUNG, the specifications of which are incorporated herein by reference in their entireties.

TECHNICAL FIELD

The invention relates to a seal arrangement for sealing the gap between a stator and a rotor.

BACKGROUND

The DE 196 18 475 A1 discloses a sealing arrangement for a non-hermetic seal of a gap between a stator and a rotor. The sealing arrangement shown there has a brush seal having a bristle package with several bristles, the bristles being wound about a core element and fixed to the core element and the bristles having sealing bristle sections, which are at an angle to the shaft of the bristles and the free ends of which run against a sealing surface of the rotor. Such bristle seals with sealing bristle sections at an angle are also referred to as hooked bristle seals. The bristle package of the brush seal is accommodated in a space, which is bounded by a supporting element and a covering element. According to the DE 196 18 475 A1, the supporting element as well as the covering element has projections for supporting these sections of the sealing bristles, which are at an angle to the shafts of the bristles.

In the case of the seal arrangement, known from the prior art, a so-called blow-down effect may occur at the bristles of the bristle package, facing the flow. As a result of this effect, these sections of the sealing bristles are moved radially in the direction of the rotor. Accordingly, the sections of sealing bristles are pressed against the rotor and thereby abraded appreciably by this blow-down effect, with the result of premature wear. Up to now, the prior art has not disclosed any seal arrangements with a hooked bristle seal, which counteracts the premature wear of the bristles resulting from the blow-down effect.

SUMMARY

Starting out from the preceding, the present invention is based on the problem of creating a novel sealing arrangement.

This problem is solved by a sealing arrangement as claimed. According to the invention, the covering element has a supporting surface at an end adjacent to the sealing bristle sections, the supporting surface contacting the bristle shafts in a defined, though locally limited region, so that the radial mobility of the sealing bristle sections in the direction of the rotor is limited.

For the inventive sealing arrangement, the radial mobility of the sealing sections of the bristles of the brush seal in the direction of the rotor is limited, as a result of which the premature wear of the bristles by a blow-down effect can largely be eliminated and, consequently, the service life of the sealing arrangement can be lengthened.

Preferably, the stiffness of the covering element, forming the supporting surface, is at least twice that of the bristle package.

According to an advantageous further development of the invention, a section of the covering element, extending between the supporting surface of the covering element and a clamping element of the brush seal, is at a distance from the bristle package with formation of a space with respect to the supporting surface, in which there is no bending. Opposite to the supporting surface of the covering element, the supporting element has a bulge, which is at a distance from the bristle package with the formation of a cavity, there being sections, wherein the cavity on the supporting element side and the space on the covering element side, in which there is no bending, overlap.

BRIEF DESCRIPTION OF THE DRAWINGS

Preferred further developments of the invention arise out of the dependent claims and the following description. Without limiting it, examples of the invention are explained in greater detail in the drawing, in which FIG. 1 shows a diagrammatic representation of an inventive sealing arrangement.

DETAILED DESCRIPTION

FIG. 1 shows a diagrammatic representation of an inventive sealing arrangement 10 for the non-hermetic sealing of a gap 11 between a rotor 12 and a stator, which is not shown. A brush seal 13 is assigned to the stator, the brush seal 13 comprising a bristle package 14 of several bristles 15, which are wound about a core element 16 and fixed by means of a clamping element 17 at the core element 16.

The bristle package 14 is disposed in an accommodating space, which is bounded by a supporting element 18 and a covering element 19. The bristles 15 of the bristle package 14 have bristle shafts 20 as well as sealing bristle sections 21, which are at an angle to the bristle shafts 20, the free ends of the sealing bristle sections 21 running against a sealing surface 22 of the rotor 12.

In the sense of the invention here, the covering element 19 has a supporting surface 23 at an end adjacent to the sealing bristle section 21. The supporting surface 23 contacts the bristle shafts 20 in a defined, locally limited region and, moreover, in such a manner, that the radial mobility of the sealing bristle sections 21 in the direction of the rotor 12 is limited. Moreover, the radial mobility of the sealing bristle sections 21 in the direction of the rotor is limited in such a manner, that the brush seal can be closed only until it makes contact with the sealing surface 22 of the rotor 12.

According to FIG. 1, a section of the covering element 19, extending between the supporting surface 23 of the covering element 19 and the clamping element 17 of the bristle package 14, is at a distance from the bristle package 14 with formation of a space 24 for the bristle shafts, in which there is no bending. Opposite to the supporting surface 23 of the covering element 19, the supporting element 18 has a bulge 25, which is also at a distance from the bristles 15 of the bristle package 14 and forms a cavity 26. Sections of the cavity 26 on the supporting element side and of the space 24 on the covering element side, in which there is no bending, overlap as shown in FIG. 1.

The radial mobility of the sealing bristle sections 21 of the bristle package 14 in the direction of the sealing surface 22 of the rotor 12 is limited by the inventive construction of the seal arrangement. As far as possible, the sealing bristle sections 21 are operated in the optimum line-to-line contact with the sealing surface 22 of the rotor 12. As a result, premature wear of the sealing bristle sections 21 can be avoided. By these means, the service life of the sealing arrangement is lengthened distinctly in comparison with that of the prior art.

According to FIG. 1, the bristle shafts 20 are supported merely locally at the supporting surface 23, facilitating pressure equalization to the space 24, in which there is no bending.

Preferably, the stiffness of the covering element 19, forming the supporting surface 23, is at least twice that of the bristle package 14 of the brush seal 13. By these means, bending of the cover element 19 as a result of the blow-down effect is avoided.

Aside from the reference symbols 10 to 26, three diameters D1 to D3 are also given in FIG. 3. D1 represents the internal diameter of the bristle package 14 in the region of the supporting surface 23 for the case that the sealing bristle sections 21 freely contact the sealing surface 22 of the rotor 12 forming a seal. The diameter D2 of the supporting surface 23 preferably is selected to be equal in size to the internal diameter D1 of the bristle package 14, so that no relevant blow-down effect occurs during the operation, and the sealing bristle sections 21 contact and seal the sealing surface 22 largely without wear. In principle, however, this applies only when the rotating sealing surface 22 is positioned concentrically with the brush seal 13.

In actual fact, however, static, that is, non-orbiting eccentricities of the rotor 12 relative to the brush seal 13, fixed to the stator, occur frequently. Such eccentricities may arise during the production or installation or may also be caused by loads, for example, as a result of gravity in the case of heavy rotors. In relation to the concentric operation, it may then be advantageous to reduce the diameter of the supporting surface 23 to a smaller value D3 (shown by the broken line in FIG. 1). By these means, it is possible to ensure that, when the rotor is in an eccentric position, the sealing bristle sections 21 contact the whole of the periphery of the sealing surface 22 so as to form a seal. Admittedly, in so doing, a blow-down effect with increased bristle wear will occur over a portion of the extent of the bristle seal. After a certain running-in phase, however, there will be less wear and a sealing arrangement will become optimum in spite of the eccentricity.

The invention claimed is:

1. A sealing apparatus for non-hermetically sealing a gap between a stator and a rotor with a brush seal, wherein the brush seal has a bristle package with several bristles, the bristles are wound about a core element and fixed to the core element, wherein the brush seal is disposed at least sectionally in an accommodating space defined by a supporting element and a covering element, wherein the bristles have sealing bristle sections, which are at an angle to the bristle shafts, and the ends of which run against a sealing surface of the rotor, the sealing apparatus further comprising:
a support surface disposed at an end of the covering element adjacent to the sealing bristle sections, wherein the supporting surface contacts the bristle shafts in a defined, locally limited region, so that the radial mobility of the sealing bristle sections is limited in the direction of the rotor.

2. The sealing apparatus of claim 1, wherein the radial mobility of the sealing bristle sections is limited in the direction toward the rotor in such a manner that the brush seal can move only to the minimum extent necessary to contact the sealing surface of the rotor.

3. The sealing apparatus of claim 1, wherein:
the covering element and the bristle package each have a stiffness; and
wherein the stiffness of the covering element forming the supporting surface is at least twice the stiffness of the bristle package.

4. The sealing apparatus of claim 1, further comprising:
a clamping element affixed over the bristles about the core element; and
wherein a section of the covering element, extending between the supporting surface of the covering element and the clamping element of the brush seal, is disposed at a substantially constant distance from the bristle package, thereby forming a straight space relative to the supporting surface.

5. The sealing apparatus of claim 4, wherein the supporting element is disposed opposite to the supporting surface of the covering element, and the supporting element has a bulge formed therein spaced-apart from the bristle package, thereby forming a cavity.

6. The sealing apparatus of claim 5, wherein the cavity on the supporting element side and the straight space on the covering element side include sections that sectionally overlap one another along the bristle package.

7. The sealing apparatus of claims 1, wherein, in relation to an internal diameter (D1) of the bristle package in the region of the supporting surface, a diameter (D3) of the supporting surface is selected so that even when a static eccentricity of the rotor relative to the brush seal occurs, the sealing bristle sections may still touch the sealing surface of the rotor over the whole extent.

8. A brush seal assembly for non-hermetically sealing a gap between a stator and a rotor, the brush seal assembly comprising:
a bristle package including a core element and a plurality of bristles;
the plurality of bristles being wound about and fixed to the core element;
each bristle having a bristle shaft, a sealing bristle section connected to the bristle shaft and disposed at an angle to the bristle shaft, and an end disposed on the sealing bristle section for running against a sealing surface of the rotor;
an enclosure defining an accommodating space within which the bristle package is disposed, the enclosure including a supporting element and a covering element; and
wherein the covering element has a support surface at an end adjacent to the sealing bristle sections, wherein the supporting surface contacts the bristle shafts in a defined, locally limited region, so that the radial mobility of the sealing bristle sections is limited in the direction of the rotor.

9. The brush seal assembly of claim 8, wherein the position of the supporting surface is selected to limit the radial mobility of the sealing bristle sections in the direction of the rotor such that the ends of the bristles contact the sealing surface of the rotor when the bristles are at the point of maximum movement in the direction of the rotor.

10. The brush seal assembly of claim 8, wherein the covering element and the bristle package each have a stiffness, the stiffness of the covering element being at least twice the stiffness of the bristle package.

11. The brush seal assembly of claim 8, further comprising:
a clamping element affixed over the bristles about the core element; and wherein a section of the covering element extending between the supporting surface and the clamping element is disposed at a substantially constant distance from the bristle package, thereby forming an uncurved space between the covering element and the bristle package.

12. The brush seal assembly of claim 11, wherein a portion of the supporting element disposed opposite the supporting surface of the covering element is configured into a bulge at a distance from the bristle package, thereby forming a cavity between the bristle package and the supporting element.

13. The brush seal assembly of claim 12, wherein at least a section of the cavity defined by the supporting element and at least a section of the uncurved space defined by the covering element, overlap in the direction of the bristle shafts.

14. The brush seal assembly of claim 8, wherein:
the innermost bristle shafts of the bristle package are disposed at a first diameter (D1) when the ends of the sealing bristle sections are in contact with the sealing surface of the rotor during operation;
the supporting surface is disposed at a second diameter (D3); and
the second diameter (D3) is selected to be less than the first diameter (D1) by an amount equal to the static eccentricity of the rotor relative to the brush seal;
whereby the sealing bristle sections remains in contact with the sealing surface of the rotor over the whole extent of the sealing surface.

15. A brush seal assembly for sealing a gap between a stator and a rotor, the brush seal assembly comprising:
a core element;
a plurality of bristles wound about and fixed to the core element, each bristle having a bristle shaft, a sealing bristle section connected to the bristle shaft and disposed at an angle to the bristle shaft, and an end disposed on the sealing bristle section for running against a sealing surface of the rotor;
a clamping element affixed over the bristles about the core element;
a covering element disposed on one side of the bristle shafts including a supporting surface disposed at an end of the covering element adjacent to the sealing bristle sections;
the supporting surface contacting the bristle shafts in a predefined region so that the radial mobility of the sealing bristle sections is limited in the direction of the rotor;
a section of the covering element extending between the supporting surface and the clamping element being disposed at a substantially constant distance from the bristle shafts, thereby forming an uncurved gap therebetween; and
a supporting element disposed on the opposite side of the bristle shafts from the covering element, a portion of the supporting element disposed opposite the supporting surface being configured into a bulge at a distance from the bristles, thereby forming a cavity between the bristles and the supporting element.

16. The brush seal assembly of claim 15, wherein at least a section of the cavity defined by the supporting element and at least a section of the uncurved space defined by the covering element, overlap in the direction of the bristle shafts.

17. The brush seal assembly of claim 16, wherein:
the innermost bristle shafts are disposed at a first diameter (D1) when the ends of the sealing bristle sections are in contact with the sealing surface of the rotor during operation;
the supporting surface is disposed at a second diameter (D3); and
the second diameter (D3) is selected to be less than the first diameter (D1) by an amount equal to the static eccentricity of the rotor relative to the brush seal;
whereby the sealing bristle sections remains in contact with the sealing surface of the rotor over the whole extent of the sealing surface.

* * * * *